United States Patent
Moore et al.

(10) Patent No.: US 11,017,324 B2
(45) Date of Patent: May 25, 2021

(54) TREE ENSEMBLE EXPLAINABILITY SYSTEM

(71) Applicant: Microsoft Technology Licensing, LLC, Redmond, WA (US)

(72) Inventors: Alexander V. Moore, Seattle, WA (US); Yaxiong Cai, Redmond, WA (US); Kristine E. Jones, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1009 days.

(21) Appl. No.: 15/597,783

(22) Filed: May 17, 2017

(65) Prior Publication Data
US 2018/0336487 A1 Nov. 22, 2018

(51) Int. Cl.
G06N 20/00 (2019.01)
G06N 20/20 (2019.01)
G06F 16/901 (2019.01)
G06N 5/00 (2006.01)
G06N 5/04 (2006.01)

(52) U.S. Cl.
CPC ......... *G06N 20/20* (2019.01); *G06F 16/9027* (2019.01); *G06N 5/003* (2013.01); *G06N 20/00* (2019.01); *G06N 5/045* (2013.01)

(58) Field of Classification Search
CPC ........ G06N 20/00; G06N 5/003; G06N 20/20; G06N 5/045; G06F 16/24578; G06F 16/9027; G06F 16/2246; G06F 16/26; G06K 9/6282; G06K 9/00268; G06K 9/6256
See application file for complete search history.

(56) References Cited

U.S. PATENT DOCUMENTS

| 6,278,464 | B1 | 8/2001 | Kohavi et al. |
| 6,301,579 | B1 | 10/2001 | Becker |
| 8,156,069 | B2 | 4/2012 | Allen et al. |
| 8,233,720 | B2 * | 7/2012 | Waragai ............ G06K 9/00228 382/205 |

(Continued)

OTHER PUBLICATIONS

Moore et al., "Tree Ensemble Explainability", Aug. 2017, Proceedings of the 34th International Conference on Machine Learning, pp. 1-6 (Year: 2017).*

(Continued)

*Primary Examiner* — Paulinho E Smith
(74) *Attorney, Agent, or Firm* — Alleman Hall Creasman & Tuttle LLP

(57) ABSTRACT

In non-limiting examples of the present disclosure, systems, methods and devices for optimizing machine-learned tree ensemble prediction systems are presented. A plurality of instances may be processed by a tree ensemble. Determinations regarding the expected output values of one or more nodes of the tree ensemble may be made based, at least in part, on the processed instances. Further determinations regarding the node contribution values of one or more nodes of the tree ensemble to downstream nodes may be made based on the node output values. In some examples, feature value ranges may be computed for one or more features of the tree ensemble. One or more tree ensemble optimization operations may be performed based on the information determined from one or more of the above-described operations.

19 Claims, 10 Drawing Sheets

(56) References Cited

U.S. PATENT DOCUMENTS

| | | | |
|---|---|---|---|
| 8,306,940 B2 | 11/2012 | Lee et al. | |
| 8,490,194 B2 | 7/2013 | Moskovitch et al. | |
| 8,533,129 B2 | 9/2013 | Kejariwal et al. | |
| 8,949,158 B2* | 2/2015 | Borthwick | G06N 7/005 706/12 |
| 9,373,087 B2* | 6/2016 | Nowozin | G06N 20/00 |
| 9,836,701 B2* | 12/2017 | Chen | G06N 20/00 |
| 10,019,622 B2* | 7/2018 | Cao | G06K 9/627 |
| 2005/0096880 A1 | 5/2005 | Morita et al. | |
| 2012/0290515 A1 | 11/2012 | Frank et al. | |
| 2013/0117280 A1 | 5/2013 | Donaldson et al. | |
| 2015/0356376 A1* | 12/2015 | Burghouts | G06K 9/4642 382/159 |
| 2015/0379426 A1 | 12/2015 | Steele et al. | |
| 2017/0337450 A1* | 11/2017 | Ozaki | G06K 9/6277 |
| 2018/0217991 A1* | 8/2018 | Dato | G06F 16/90335 |
| 2018/0293292 A1* | 10/2018 | Odibat | G06K 9/6282 |
| 2018/0336487 A1* | 11/2018 | Moore | G06N 5/003 |
| 2019/0095507 A1* | 3/2019 | Elisseeff | G06N 3/006 |
| 2019/0250975 A1* | 8/2019 | Bertiger | G06F 11/0721 |
| 2020/0125635 A1* | 4/2020 | Nuolf | G06F 9/451 |

OTHER PUBLICATIONS

Fan, Wei, "On the Optimality of Probability Estimation by Random Decision Trees", In Proceedings of 19th National Conference on Artificial Intelligence, Jul. 25, 2004, 6 pages.

Tam, et al., "An Analysis of Machine- and Human-Analytics in Classification", In Journal of IEEE Transactions on Visualization and Computer Graphics, vol. 23, Issue 1, Jan. 2017, 10 pages.

Goodman, Bryce, et al. European Union regulations on algorithmic decision-making and "right to explanation", located online on Aug. 31, 2016 at: https://arxiv.org/abs/1606.08813v3, 9 pages.

Turner, Ryan, "A Model Explanation System: Latest Updates and Extensions", from the 2016 ICML Workshop on Human Interpretability in Machine Learning (WHI 2016), located online on Jun. 30, 2016 at: https://arxiv.org/abs/1606.09517v1, 5 pages.

Lipton, Zachary C., "The Mythos of Model Interpretability", from the 2016 ICML Workshop on Human Interpretability in Machine Learning (WHI 2016), obtained on Jun. 16, 2016 at: https://arxiv.org/abs/1606.03490v2, 5 pages.

Hara, Satoshi, et al., "Making Tree Ensembles Interpretable", from the 2016 ICML Workshop on Human Interpretability in Machine Learning (WHI 2016), located online on Jun. 17, 2016 at: https://arxiv.org/abs/1606.05390v1, 5 pages.

Caruana, Rich et al., "Intelligible Models for HealthCare: Predicting Pneumonia Risk and Hospital 30-Day Readmission", from the Proceedings of the 21th ACM SIGKDD International Conference on Knowledge Discovery and Data Mining, in Sydney, Australia, Aug. 10-13, 2015, 10 pages.

\* cited by examiner

TREE ENSEMBLE EXPLAINABILITY SYSTEM

BACKGROUND

Computer-learned tree ensemble systems have far reaching applications and can accurately determine correct hypotheses when properly built and trained. When tree ensembles are run on a set of data, the various contribution values that nodes along an instance's path have on a final resulting hypothesis are generally unknown, ultimately making it difficult, if not impossible, to understand why correct or incorrect hypotheses are generated by tree ensembles.

It is with respect to this general technical environment that aspects of the present technology disclosed herein have been contemplated. Furthermore, although a general environment has been discussed, it should be understood that the examples described herein should not be limited to the general environment identified in the background.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter. Additional aspects, features, and/or advantages of examples will be set forth in part in the description which follows and, in part, will be apparent from the description or may be learned by practice of the disclosure.

Non-limiting examples of the present disclosure describe systems, methods and devices for optimizing machine-learned tree ensemble prediction systems. A plurality of instances may be provided to, and processed by, a computer-implemented tree ensemble, and determinations may be made based on that processing regarding the node output and node contribution values of nodes within that tree ensemble. For example, given the known leaf node output values and distribution of processed instances in the leaf nodes of a tree ensemble, node contribution values for each internal node and the entrance node of the tree ensemble may be determined. Additional determinations may also be made regarding which nodes had the greatest impact on a resulting hypothesis and its corresponding output value. In some examples, range values for an input to one or more nodes in the tree ensemble that would result in the same outcome as a particular instance may be computed. For example, range values for inputs to nodes that share redundant features in the tree ensemble that would result in the same outcome as a particular instance may be computed.

According to some examples, a plurality of instances may be clustered according to feature contribution impact. That is a plurality of clustering operations may be performed to group feature contributions according to their impact at the instance level, and ultimately clusters comprising a plurality of feature contribution impact scores can be compiled. These clusters may then be utilized in generating a prediction for each instance and comparing those predictions against training data. This information may be utilized in re-training a tree ensemble system by, for example, increasing the weight of instances in clusters that have a threshold number or percentage of incorrect predictions, thereby improving tree ensemble accuracy.

BRIEF DESCRIPTION OF THE DRAWINGS

Non-limiting and non-exhaustive examples are described with reference to the following figures.

DETAILED DESCRIPTION

Figure 1:
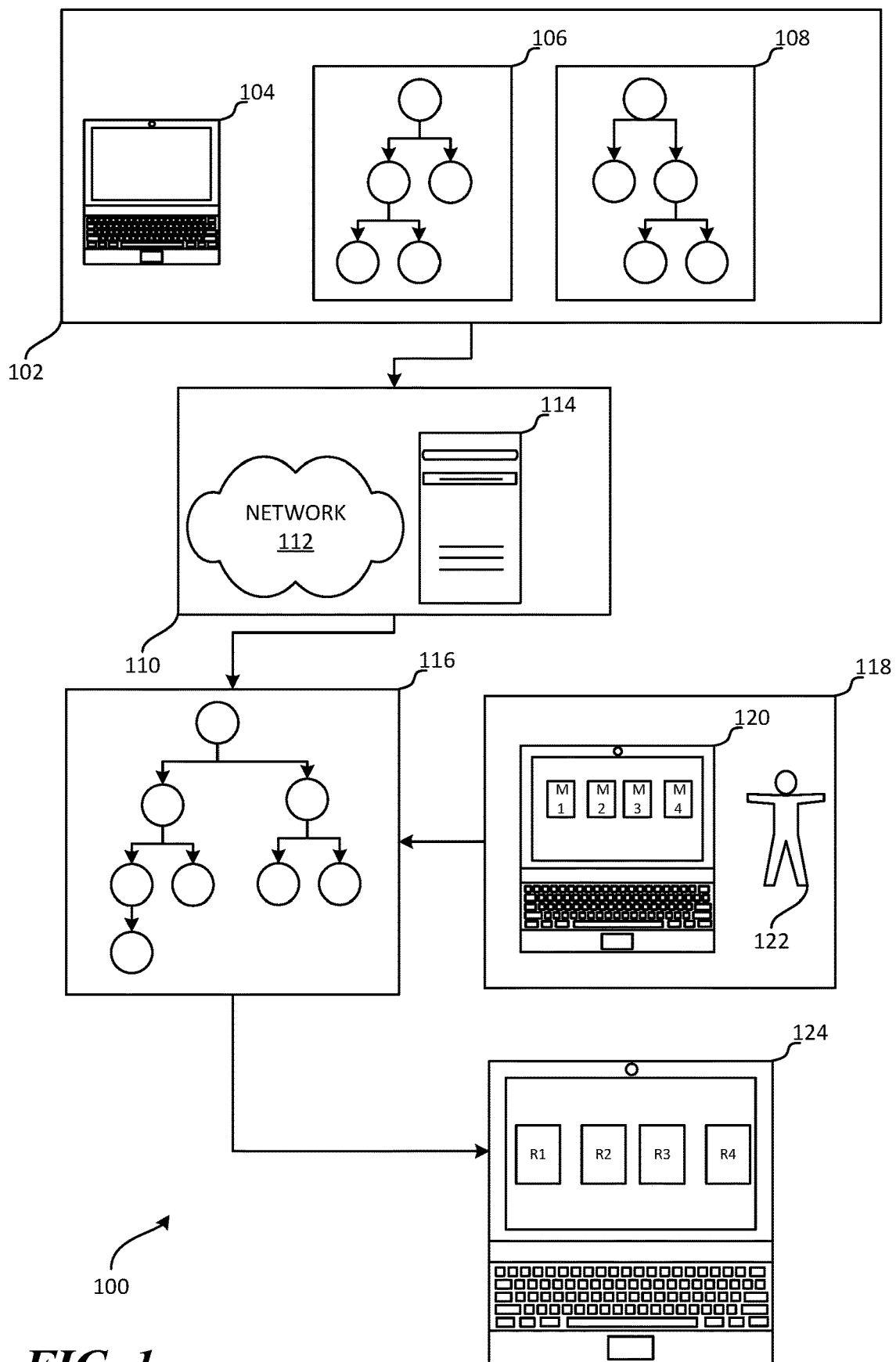
FIG. 1 is a schematic diagram illustrating an example distributed computing environment for optimizing machine-learned tree ensemble prediction systems.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

The various embodiments and examples described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the claims.

Generally, the present disclosure is directed to systems, methods and devices for optimizing machine-learned tree ensemble prediction systems. Certain aspects provide mechanisms for making determinations regarding the output values that nodes have in a tree ensemble. In some aspects, node feature contribution values may be determined and ranked according to their impact on a resulting hypothesis for an instance and the generated output value that resulted in that hypothesis. That is, aspects provide for making determinations of what an expected output value for one or more internal nodes would be for a given instance if that instance stopped at a given node for which the expected output value is being computed, and those values may be used in computing node feature contribution values of upstream nodes. Further aspects provide mechanisms for determining range values at which nodes in tree ensemble data structures split to downstream nodes for a particular input instance.

The systems, methods and devices for optimizing machine-learned tree ensemble prediction systems described herein may be applied to single decision trees, gradient-boosted decision trees, random forests, and other tree-ensemble based systems. Tree ensemble prediction systems attempt to output a determined most suitable hypothesis by processing input data through a series of operations, which individually provide an indication of whether one or more potential hypotheses that may be output by a particular ensemble system are correct based on values that have been assigned to data at each operation and the particular order that the operations were performed (i.e., the path that the data took through an ensemble). By applying the mechanisms described herein, tree ensembles can be configured to more accurately determine correct hypotheses, such as by determining the nodes in those trees that have a substantial impact on one or more splits that lead to correct or incorrect determinations for one or more instances that have been processed by a tree ensemble. Similarly, computing the node output value for nodes in an ensemble provides information that can be utilized in determining why instances processed by a tree ensemble end up at certain leaf nodes, as well as the reasons that instances have their finalized values at those leaf nodes. Thus the mechanisms described herein may be utilized in determining the most important junctures in a tree ensemble as they relate to hypotheses being generated. Additionally, determining range values for node splits in a tree ensemble provides another set of data points that can be used to further tailor a tree ensemble to accurately produce correct hypotheses. Thus, the systems, methods and devices provided herein provide mechanisms for interpreting the output of decision-tree-ensemble-based machine-learning systems, including which features drove increases in its score and which features drove decreases. Those features may be provided in a ranked list based on feature importance as they relate to an instance's path through a tree ensemble, in addition to providing a range of values for each feature for which its contribution would have resulted in the same outcome for an instance.

As used herein, a leaf node describes an output node in a tree ensemble system. That is, a leaf node is the final node that an instance is provided to in a tree ensemble, and a value and determined hypothesis is provided upon an instance reaching such a node. An instance, as used herein, describes the processing of data through a tree ensemble (i.e., the processing of data that results in a generated hypothesis for that data). An entrance node, as used herein, is the first node in a tree ensemble that an instance is run through. From the entrance node, an instance may travel through zero or more internal nodes in a tree ensemble, depending on the depth of the tree ensemble structure, until the instance finally reaches a leaf node and an output is generated.

Tree ensembles have many diverse uses, and if properly tailored (e.g., through machine learning and/or human training), provide excellent constructs for receiving one or more data types for which they are built to process, and generating a hypothesis based on that data and the one or more nodes that the data as an instance travels through. Tree ensembles vary from the very simple to the extremely complex, depending on the number of features that they are built to handle, the number of trees in the ensemble, the number and types of calculations that are performed at each node, their incorporation of boosting or other accuracy-increasing algorithms, etc.

As a first example, a tree ensemble may be utilized for determining whether two people are related and generating a hypothesis based on the data the system receives and the nodes that the data is processed through. The data may pass through one or more nodes before the system eventually generates a hypothesis based on the final value as output through a leaf node. For example, an entrance node may perform a determination as to whether two people share a last name and an internal node may determine whether two people share a payment instrument (e.g., a credit card, a debit card, etc.). Based on the values that are applied to the determinations made at each of those nodes, a hypothesis as to whether the two people are related, as well as a value corresponding to that hypothesis, may be generated at a leaf node and that result may be output and caused to be displayed via a graphical user interface.

As a second example, a tree ensemble may be utilized for determining media (e.g., videos, movies, shows, songs, podcasts, etc.) to recommend to a user based on a variety of data points that may be processed by one or more nodes of a tree ensemble and one or more trees of that tree ensemble. For example, if the goal of the tree ensemble is to accurately suggest movies to a user, information such as past viewing history, likes or dislikes for past viewing history, the age of the user, the gender of the user, the country of residence of the user, etc. may be processed through various nodes in a tree ensemble, and one or more suggestions may be generated for that user based on the path that the instance for that user took and the values of the nodes in that path.

Other examples of the types of tree ensembles that may be analyzed and modified through the mechanisms and devices described herein include tree ensembles for predicting the likelihood that a person or persons will behave in a certain manner (e.g., will a person decide to purchase a full version of software they have demoed, will a baseball player perform well given various circumstances of a game), whether safety protocols should be applied to a situation (e.g., should an airport ground flights because of inclement weather, should automated brakes be applied in a car given a certain situation), and a variety of metric prediction applications (e.g., will a package be delivered on schedule, is a division of a company likely to hit their performance goals), among others.

In providing systems, methods, and devices for determining the output values that nodes have in relation to the generation of a hypothesis for a given instance that is processed by a tree ensemble, determining the contribution that each node in an ensemble provides to downstream nodes in that ensemble, and determining ranges of values for nodes and their corresponding feature determinations in an ensemble that would result in the same outcome as a particular instance, users may be provided with information that may be utilized to modify tree ensembles to make more accurate predictions. Additional useful information may also be determined and provided to users through the performance of one or more of the above-described tree ensemble optimization mechanisms. For example, by providing the ability to view node value information and node contribution information as it relates to a corporate division meeting performance goals, and what feature nodes had high and low impact on that metric, managers can attempt to focus on the important features that are modifiable to increase performance of the division.

In another example, in providing the ability to view node value information and node contribution information as it relates to determining whether to ground flights because of inclement weather, an airline may choose to increase the number of customer service agents on days that are predicted to meet one or more data points that relate to high node impact on grounding flights, while choosing to keep staffing at normal levels on days that are predicted to meet one or more data points that relate to low node impact on grounding flights.

In another example, automated car brake manufacturers may determine that the software that makes braking determinations should be modified to place more emphasis on the brake decision for input they deem to be important but for which a node value currently has a low impact.

In yet another example, automated car braking manufacturers may also be provided with the data for braking decisions that nonetheless resulted in accidents (e.g., a decision to brake or not brake resulted in an accident occurring), and determine from the node value and contribution information, why an inappropriate braking decision was made in those cases.

In some examples a determined hypothesis may comprise one of two possible hypotheses (e.g., are related, are not related) and that determined hypothesis may be generated based on the final value of an instance at a leaf node. For example, if the final value is positive a first determined hypothesis may be generated and caused to be displayed, and if the final value is negative a second determined hypothesis may be generated and caused to be displayed. Alternatively, a tree ensemble may have many different potential hypotheses which may be generated based on a variety of factors, such as the information provided for an instance, the nodal path that the instance took in the tree ensemble, the values associated with the nodes that the instance passed through in the tree ensemble, etc. Additionally, although a determined hypothesis may be generated based on arriving at a positive or negative value, a determined hypothesis may also be generated based on various threshold values being reached at a leaf node. For example, a hypothesis may be generated for values in a certain range (e.g., more than X but less than Y, greater than X, less than Y, etc.).

The data related to a particular instance may be processed through one set of nodes in a first tree in an ensemble and one or more additional sets of nodes in one or more additional trees of the ensemble. In such a case, the data may be processed through nodes that make the same determinations, but with different corresponding values tied to those determinations. In some examples the data may be processed through nodes that make some of the same determinations and others that do not make the same determinations. In other examples, data may be processed through nodes that make the same determinations but that are ordered differently in the trees of an ensemble that the data is being processed through. Thus, in tree ensembles that have even minimal complexity, modifying a node contribution value of a single node can have a significant impact on an ensemble as a whole. As such it is useful to understand how the values of individual nodes contribute to a hypothesis being determined, as well as what contribution each node has to the scoring of an instance that is processed through an ensemble. Determining range values for nodes in a tree ensemble that would have produced the same determined hypotheses for particular instances is also useful in understanding how similar instances may perform when processed through the tree ensemble.

According to some examples, the mechanisms described herein may be utilized in automatically clustering instances. For example, if the instances are customers and the features are attributes associated with each customer, the mechanisms described herein may provide automatic customer clustering based on per instance feature scores. That is, aspects of the invention provide a per-instance, per-feature, score (contribution). As a result, each customer may have a score for each feature associated with that customer. If each customer's feature scores are ranked from highest to lowest, then all customers may be clustered automatically into different clusters by feature score ranking. Various clustering techniques may be applied to such associations/clusters (e.g., K-means, hierarchical, etc.). These clustering techniques may be applied across several areas an industries, including segmentation, topic modeling, and market research, among others.

According to additional examples, a predicted hypothesis may be generated for each instance, and a true or false label may be associated with each instance based on training data (e.g., an instance may be human classified as relating to one or more true hypothesis). The instances may be clustered according to their feature impact rankings, and the accuracy of the tree ensemble predictions may be measured against the true labels for those instances. For clusters that meet a threshold number or percentage of incorrect model prediction, one or more instances within such clusters may be given larger weights and used to re-train the ensemble system. A training algorithm may take these weights into consideration and be more sensitive to correctly predicting these instances, thus improving ensemble accuracy without human intervention, leveraging per-instance feature contributions to do so.

In determining output values for nodes within a tree ensemble according to the mechanisms described herein, it is assumed that both the inputs to the ensemble (i.e., the data associated with each instance that is provided to an entrance node), and the outputs (i.e., the value and determined hypotheses that are generated by the system at the leaf node) of the ensemble, are known.

According to examples, in determining the feature importance of nodes of a tree ensemble, the expected node output value for an internal node directly upstream from a leaf node may be computed according to the following steps, of which a user may institute the execution via interacting with a graphical user interface and one or more applications for optimizing machine-learned tree ensemble systems. A plurality of instances may be received and processed by a tree ensemble system and a request to access the ensemble tree structure may be received via a user interface. For example, a user may input a request to determine the expected output value of one or more internal nodes in the ensemble.

Upon receiving the request, each leaf node that is directly downstream from an internal node whose expected output value is being determined may be analyzed. In performing the leaf node analysis, a determination is made for each analyzed leaf node as to the percentage of instances that ended at each of those respective leaf nodes. Further analysis also provides a determination of the output value for each of those leaf nodes.

Upon performing this analysis a calculation is made as to the product of the output value of each of the analyzed leaf nodes and the percentage of instances that ended at each of those respective leaf nodes (e.g., if 80% of the instances ended at a first analyzed leaf node and that leaf node has an output value of −7 the calculation would be 0.8*−7; if 5% of the instances ended at a second analyzed leaf node and that leaf node has an output value of 2 the calculation would be 0.05*2).

The product of the above calculation for each leaf node is then normalized by calculating a quotient for each of those products (the dividend) and the total percentage of instances that ended at the analyzed nodes (the divisor). Upon normalizing the products, the node output value for the node directly upstream from the analyzed leaf nodes is determined by combining each of the normalized products for the analyzed nodes into a sum. That is, if the normalized product is −6.6 for a first analyzed leaf node, and the normalized product is 0.12 for a second analyzed leaf node, the node output score for the node directly upstream from those leaf nodes would be −6.48. Upon determining the expected node output value for the node upstream from the analyzed leaf nodes, that value may be caused to be displayed.

The above-described internal node expected output value steps may be performed for each subsequent upstream node until an expected output value for the entrance node of the tree ensemble is determined. However, rather than analyzing leaf node output values in calculating the expected node output values for upstream nodes, the expected node output values for the nodes directly downstream from the node for which an expected output value is being determined are used in performing that calculation. Additional discussion involving further internal node expected output value determination is provided below in relation to FIG. 2.

In determining node contribution values to downstream nodes within a tree ensemble according to the mechanisms described herein, it is assumed that both the inputs to the ensemble (i.e., the data associated with each instance that is provided to an entrance node) and the outputs (i.e., the value and determined hypotheses that are generated by the system at the leaf node) of the ensemble are known.

According to examples, the node contribution for an internal node directly upstream from a leaf node may be determined according to the following steps, which may be performed automatically, or which a user may perform via interacting with a user interface and one or more applications for optimizing machine-learned tree ensemble systems. A plurality of instances may be received and processed by a tree ensemble system and a request to access the ensemble tree structure may be received via a user interface.

The request to access the ensemble tree structure may comprise a request to determine the node contributions of one or more internal nodes, including an entrance node, of the ensemble tree structure as it relates to a particular instance. That is, a request may be received that specifies that a user generating the request would like to be provided with information related to the relative score contribution for a node as it relates to a split from that node when the node splits to a downstream node based on the feature determination made at that node.

Upon receiving the request, an output value for a leaf node directly downstream from a node whose contribution is being calculated is determined. The expected output value for the node whose contribution is being calculated is also determined by, for example, the mechanisms described above with regard to determining internal node expected output values. Upon determining these two output values, the difference between the leaf node output value and the upstream node's expected output value is calculated. That difference is then assigned to the upstream node as that node's contribution value to the leaf node. Upon determining the node contribution value for the node upstream from the analyzed leaf node that value may be caused to be displayed.

The above described node contribution steps can be repeated for each additional upstream node. However, in so doing, the previously calculated expected output value replaces the leaf node output value as the minuend in the subtraction operation. The computed feature contributions may be added up for tree ensembles comprising a plurality of trees. Thus, when feature contributions are added up for one or more features that are redundant across a plurality of trees of an ensemble, those features may be ranked according to their overall impact to downstream nodes at the tree ensemble level. As such, a feature that has a small contribution in one tree of an ensemble may nonetheless have a large impact on a tree ensemble if it has a larger contribution associated with it in other trees of that ensemble, and this combined impact can be calculated and displayed according to the mechanisms described herein. Additional discussion involving internal node contribution value determination is provided below in relation to FIG. 3.

Determinations may be made as to the smallest possible input value range for a feature that would have produced the same set of contributions within a tree ensemble based on a processed instance. For example, when the tree ensemble at issue involves one or more trees that incorporate that feature in a plurality of nodes, but the value for which that node splits in one or more directions (i.e., a positive or negative contribution split for a particular hypothesis) differs amongst at least two of those trees, it is useful to understand what the smallest range of values for that feature could have been for an instance while resulting in generation of the same hypothesis being determined for that instance.

In determining the smallest possible range that would have produced the same set of contributions (i.e., the feature value ranges) for a particular feature within a tree ensemble according to the mechanisms described herein, it is assumed that both the inputs to the ensemble (i.e., the data associated with each instance that is provided to an entrance node) and the outputs (i.e., the value and determined hypotheses that are generated by the system at the leaf node) of the ensemble are known.

According to examples, the feature value range for a feature of a tree ensemble may be determined according to the following steps, which may be performed automatically, or which a user may perform by interacting with a user interface and one or more applications for optimizing machine-learned tree ensemble system. An instance may be received and processed by a tree ensemble system and a request to access the ensemble tree structure may be received via a user interface. Upon receiving the request, the following steps may be performed for one or more nodes in the tree ensemble. Additionally or alternatively, the steps may be performed independently for positive and negative contributing feature nodes as they related to a hypothesis.

As an instance is received by the entrance node of each tree in an ensemble, a range for that feature for which common feature nodes split is reduced from a baseline range of negative infinity to positive infinity. Thus, if the entrance node splits (e.g., generates a positive or negative contribution score applied to a subsequent downstream node) on feature value Z for a particular feature, and the instance causes that split based on a received value X for that feature that is less than Z, the range becomes (−∞, Z). Alternatively, if the instance causes a split based on a received value X for that feature that is greater than Z, then the range becomes (Z, ∞).

In some examples, if later in the same tree, or a different tree within the tree ensemble, a different node splits on feature value $Z_1$ for the same feature, and the instance causes that split based on a received value Y for that feature that is less than $Z_1$, then $Z_1$ is a potential new upper bound for that feature. That is, whichever value is smaller (i.e., $Z_1$ or the current upper bound), will be the new upper bound. For example, where the current range is (−∞, Z) and $Z_1$ is less than Z, the new range is then reduced to (−∞, $Z_1$).

In other examples, if later in the same tree, or a different tree within the three ensemble, a different node splits on feature value $Z_1$ for the same feature, and the instance causes that split based on a received value for Y for that feature that is greater than $Z_1$, then $Z_1$ is a potential new lower bound for that feature. That is, whichever value is larger (i.e., $Z_1$ or the current lower bound), will be the new lower bound. For example, where the current range is (Z, ∞) and $Z_1$ is greater than Z, the new range is then reduced to ($Z_1$, ∞). Alternatively, if $Z_1$ is less than Z, the range remains (Z, ∞).

The above process for determining feature ranges can be repeated for each downstream node such that feature ranges are determined for each feature represented in the tree ensemble. Further discussion related to determining feature ranges is provided below with relation to FIGS. 4-5.

Turning specifically to the examples shown in the Figures, FIG. 1 is a schematic diagram illustrating an example distributed computing environment 100 for optimizing machine-learned tree ensemble prediction systems. Distributed computing environment 100 includes original tree ensemble sub-environment 102, tree ensemble processing sub-environment 110, optimized tree ensemble sub-environment 116, user input sub-environment 118, and user output sub-environment 124.

Original tree ensemble sub-environment 102 includes computing device 104, decision tree 106, and decision tree 108, which are part of a single tree ensemble. According to examples, the tree ensemble may comprise a gradient-boosted decision tree ensemble, a random forest, or another type of tree ensemble based system. A user may access computing device 104 and interact with the tree ensemble, remotely or locally, and input one or more data sets into the tree ensemble. For example, a data set comprised of a plurality of instances may be provided to decision tree 106 having a first node structure, and decision tree 108 having a second node structure. Although differing structurally, decision tree 106 and decision tree 108 may contain common nodes that split on the same features, but with different output values tied to those nodes, and correspondingly different node contributions associated with them.

Tree ensemble processing sub-environment 110 includes network 112 and one or more server computing device, such as server computing device 114. Computing device 104 may communicate with server computing device 114 via network 112, and server computing device 114 may perform one or more tree ensemble processing operations, including processing one or more instances through decision tree 106 and decision tree 108.

According to some examples, upon processing one or more data sets through decision tree 106 and decision tree 108, output values for each instance of the processed data sets may displayed on a graphical user interface of a computing device, such as computing device 104.

A user may interact with the output values for the processed data sets and request, via network 112, that one or more operations be performed to optimize the tree ensemble that comprises decision tree 106 and decision tree 108. According to examples, such a request may comprise one or more of: a request to determine the expected output values of one or more nodes in decision tree 106 and decision tree 108, a request to determine the node value contributions of one or more nodes in decision tree 106 and decision tree 108, and a request to compute feature value ranges for one or more nodes in decision tree 106 and decision tree 108.

Upon receiving a request to determine the expected output values of one or more nodes in decision tree 106 and decision tree 108, server computing device 114 may cause classification of the processed data from the one or more datasets received via network 112 to be displayed (e.g., sending to a graphical user interface a chart or other readout type illustrating one or more arrived-at hypotheses relating to one or more instances from the processed data and/or the value of the one or more instances as determined at leaf nodes for those instances).

Server computing device 114 may compare the resulting classification of the processed instances to a pre-determined preferred classification of the data. For example, the data comprising the one or more instances may comprise a set of pre-classified test data that has been pre-classified by one or more users as corresponding to one or more hypotheses. Thus, according to a specific example, if the tree ensemble that the data is input into generates hypotheses regarding whether people are related to one another, the one or more users may know whether individuals from each instance in that data are related and pre-classify that data into known answers corresponding to the hypotheses output by the tree ensemble. Similarly, if the tree ensemble that the data is input into generates hypotheses regarding what movies people may enjoy based on one or more data points, the one or more users may have predetermined additional movies that an instance/test case user enjoys that are not included in the data for particular instances, and the data for such an instance/test case may be pre-classified into known answers corresponding to the hypothesis output by the tree ensemble (e.g., this instance/test case is likely to enjoy one or more movies such as movies A, B, and C).

According to some examples, server computing device 114 may make a determination that one or more preferred classifications of instances from the dataset do not correspond to a classification made through processing of those instances through the tree ensemble. In such a case, server computing device 114 may further determine that a node output value of the tree ensemble contributed to a misclassification of the data. Upon such determination, server computing device 114 may cause that information to be displayed such that a user may modify one or more characteristics of the tree ensemble such that it produces more accurate predictions.

According to additional examples, upon receiving a request to determine the node value contributions of one or more nodes in decision tree 106 and decision tree 108, node contribution values may be determined by server computing device 114 based on the processing of one or more instance through the tree ensemble, and information associated with those node contribution value determinations may be displayed via a graphical user interface on a computing device, such as computing device 104.

Upon receiving a request to compute node contribution values of one or more nodes in decision tree 106 and decision tree 108, server computing device 114 may cause classification of the processed data from the one or more datasets received via network 112 to be displayed (e.g., sending to a graphical user interface a chart or other readout type illustrating one or more arrived at hypotheses relating to one or more instances from the processed data and/or the value of the one or more instances as determined at leaf nodes for those instances). Server computing device 114 may further compare the resulting classification of those processed instances to a pre-determined preferred classification of the data as described above.

According to some examples, server computing device 114 may make a determination that one or more preferred classifications of instances from the dataset do not correspond to a classification made through processing of those instances through the tree ensemble. In such a case, server computing device 114 may further determine that one or more node contribution values of the tree ensemble contributed to a misclassification of the data. Upon such determination, server computing device may cause that information to be displayed such that a user may modify the tree ensemble such that it produces more accurate predictions. Server computing device 114 may also automatically modify one or more aspects of the tree ensemble based on its analysis by, for example, adjusting one or more node contribution values that contributed to the misclassification.

According to other examples, server computing device 114 may cluster a plurality of instances according to feature contribution impact. That is, server computing device 114 may perform a plurality of clustering operations on one or more feature contributions according to their impact at the instance level, and ultimately clusters comprising a plurality of feature contribution impact scores may be compiled. These clusters may then be utilized in generating a prediction for each instance and comparing those predictions against training data. This information may be utilized in re-training a tree ensemble system by, for example, increasing the weight of instances in clusters that have a threshold number or percentage of incorrect predictions, thereby improving tree ensemble accuracy.

According to additional examples, upon receiving a request to compute feature value ranges of one or more nodes in decision tree 106 and decision tree 108, feature value ranges may be determined by server computing device 114 based on the processing of one or more instance through the tree ensemble, and information associated with those feature value range determinations may be displayed via a graphical user interface on a computing device, such as computing device 104.

Upon receiving a request to compute node contribution values of one or more nodes in decision tree 106 and decision tree 108, server computing device 114 may cause classification of the processed data from the one or more datasets received via network 112 to be displayed (e.g., sending to a graphical user interface a chart or other readout type illustrating one or more arrived at hypotheses relating to one or more instances from the processed data and/or the value of the one or more instances as determined at leaf nodes for those instances). Server computing device 114 may further compare the resulting classification of those processed instances to a pre-determined preferred classification of the data as described above.

According to some examples, server computing device 114 may make a determination that one or more preferred classifications of instances from the dataset do not correspond to a classification made through processing of those instances through the tree ensemble. In such a case, server computing device 114 may further determine that one or more feature value ranges of the tree ensemble contributed to a misclassification of the data. Upon such determination, server computing device 114 may cause that information to be displayed so that that a user may modify the tree ensemble and facilitate its generation of more accurate predictions.

The tree ensemble comprising decision trees 106 and 108 may be reconfigured through one or more of the mechanisms described above and optimized tree ensemble sub-environment 116 illustrates the optimized reconfiguration of at least one of the decision trees of such an ensemble. Although the optimized reconfiguration depicts a different structure entirely from both of decision trees 106 and 108, reconfiguration may comprise maintaining the node structure of those decision trees and modifying one or more values associated with the nodes of those decision trees.

A user such as user 122 in user input sub-environment 118 may access one or more movies on a computing device, such as computing device 120. For example, user 122 may have watched each of movies M1, M2, M3 and M4 on one or more computing device, such as computing device 120 and one or more video streaming services. According to examples, information related to user 122, including information related to her movie watching history, as well as additional information such as age, gender, movie likes and dislikes provided via one or more video streaming services, etc., may be provided to the optimized tree ensemble in optimized tree ensemble sub-environment 116. Accordingly, the optimized tree ensemble may be built for providing video and movie suggestions to users, such as user 122, based on information associated with past viewing history and the other information discussed above. Thus, when user 122's information is provided to the optimized tree ensemble in optimized tree ensemble sub-environment 116, optimized hypotheses regarding movies that user 122 is likely to enjoy based on the information input into the optimized tree ensemble may be caused to be displayed on a computing device, such as computing device 124 as illustrated by movie recommendations R1, R2, R3 and R4.

Figure 2:
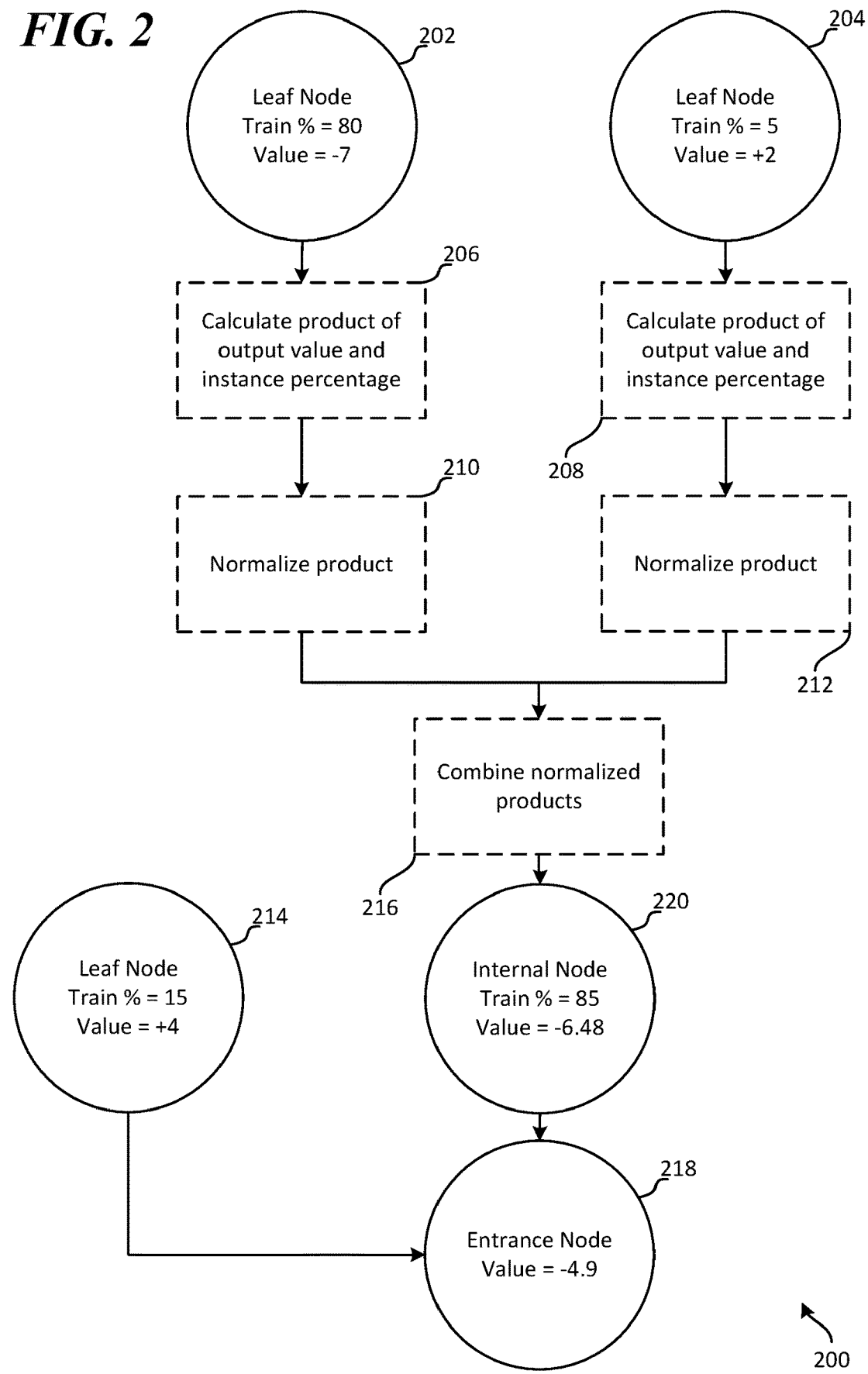
FIG. 2 is a schematic diagram illustrating an exemplary mechanism for determining expected output values of internal nodes and entrance nodes of a tree ensemble.

FIG. 2 is a schematic diagram 200 illustrating an exemplary mechanism for determining the expected output values of internal nodes and entrance nodes of a tree ensemble.

Schematic diagram 200 provides a basic illustration of how expected node output values for internal nodes and entrance nodes of a tree ensemble may be calculated according to the mechanisms described herein. The illustrated environment shown in schematic diagram 200 assumes that a plurality of instances have been received by a tree ensemble comprised of leaf nodes 202, 204 and 214, internal node 220, and entrance node 218. The illustrated environment also shows expected output value determination operations 206, 208, 210, 212 and 216, which may be performed by one or more computing devices, such as server computing device 114, which is depicted in FIG. 1.

In computing expected output values of internal nodes according to the mechanisms described herein, the percentage of instances that arrived at each of leaf nodes 202, 204, and 214 are known, as well as the output values for each of those nodes. As illustrated, an exemplary percentage of instances that arrived at leaf node 202 has been designated as 80%, an exemplary percentage of instances that arrived at leaf node 204 has been designated as 5% and an exemplary percentage of instances that arrived at leaf node 214 has been designated as 15%. Similarly, output values of −7, +2, and +4, have been designated for leaf nodes 202, 204, and 214, respectively.

At operation 206 the non-normalized expected output value for leaf node 202 is calculated. That is, the percentage of instances that arrived at leaf node 202 is multiplied by the output value for leaf node 202 (i.e., 0.80*−7) to arrive at a product that represents a non-normalized expected output value for leaf node 202. As such, the non-normalized expected output value for leaf node 202 is −5.6. Similarly, at operation 208 the non-normalized expected output value for leaf node 204 is calculated. That is, the percentage of instances that arrived at leaf node 204 is multiplied by the output value for leaf node 204 (i.e., 0.05*2). As such, the non-normalized expected output value for leaf node 204 is 0.01.

At operation 210 the non-normalized expected output value for leaf node 202 is normalized by dividing the non-normalized expected output value for leaf node 202 by the percentage of instances that traveled through internal node 220. Similarly, at operation 212, the non-normalized expected output value for leaf node 204 is normalized by dividing the non-normalized expected output value for leaf node 204 by the percentage of instances that traveled through internal node 220. At operation 216 the normalized expected output values for each of leaf nodes 202 and 204 are combined into their sum, and that sum value is assigned as the expected output value for internal node 220. As such, the expected output value of −6.48 is assigned to internal node 220 (i.e., −6.6+0.12=−6.48). This process may be performed for each upstream node. For example, this process may be performed to calculate an expected output value for entrance node 218 for which a value of −4.9 has been assigned.

Figure 3:
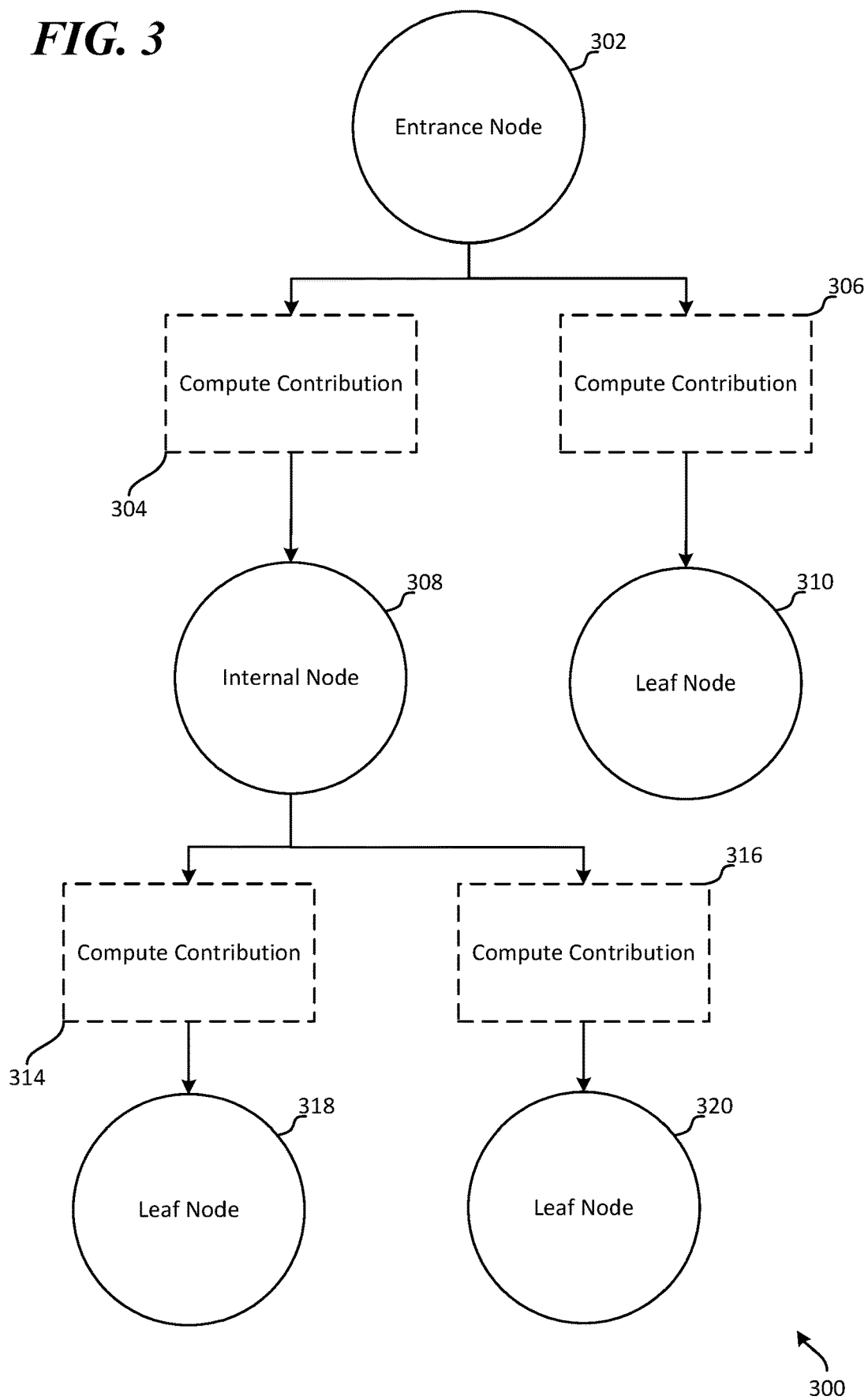
FIG. 3 is a schematic diagram illustrating an exemplary mechanism for determining the contributions of internal nodes and entrance nodes to corresponding downstream nodes of a tree ensemble.

FIG. 3 is a schematic diagram 300 illustrating an exemplary mechanism for determining the contributions of internal nodes and entrance nodes to corresponding downstream nodes of a tree ensemble.

Schematic diagram 300 provides a basic illustration of how node value contributions for internal nodes and entrance nodes of a tree ensemble may be calculated according to the mechanisms described herein. The illustrated environment shown in schematic diagram 300 assumes that a plurality of instances have been received by a tree ensemble comprised of leaf nodes 310, 318 and 320, internal node 308, and entrance node 302. The illustrated environment also shows node value contribution determination operations 304, 306, 314 and 316 which may be performed by one or more computing devices, such as server computing device 114, which is depicted in FIG. 1.

In computing node value contributions the mechanisms described herein begin at the leaf nodes and move upstream towards the entrance node of a tree ensemble. For example, a known node output value for leaf node 318 is the starting value needed to perform the node value contribution determination for internal node 308's contribution to leaf node 318. The other value that must be determined is the expected node output value for the internal node directly upstream from leaf node 318. Thus, the expected node output value for internal node 308 may be determined according to the mechanisms described herein. Upon determining the expected node output value for internal node 308, that value may be subtracted from the node output value for leaf node 318 at operation 314 and the difference of those values may be assigned as the node contribution value for internal node 308 when an instance splits from node 308 to node 318.

A known node output value for leaf node 320 is the starting value needed to perform node value contribution determination for internal node 308's contribution to leaf node 320. The other value that must be determined is the expected node output value for the internal node directly upstream from leaf node 320. Thus, the expected node output value for internal node 308 may be determined according to the mechanisms described herein. Upon determining the expected node output value for internal node 308, that value may be subtracted from the node output value for leaf node 320 at operation 316 and the difference of those values may be assigned as the node contribution value for internal node 308 when an instance splits from node 308 to node 320.

Node contribution values for entrance node 302 may be determined similarly to the node contribution values for internal node 308. However, rather than taking the known leaf node output values for leaf node 318 and leaf node 320 and subtracting the expected output value for internal node 308 from those values, the output values for internal node 308 and leaf node 310 are determined and the expected output value of entrance node 302 is subtracted from those values to determine its node value contribution to each of those respective nodes. Specifically, to determine the node contribution value of entrance node 302 when an instance splits to internal node 308, the expected node output value for entrance node 302 is subtracted from the expected node output value for internal node 308 at operation 304. Likewise, to determine the node contribution value of entrance node 302 when an instance splits to leaf node 310, the expected node output value for entrance node 302 is subtracted from the node output value for leaf node 310 at operation 306.

Figure 4:
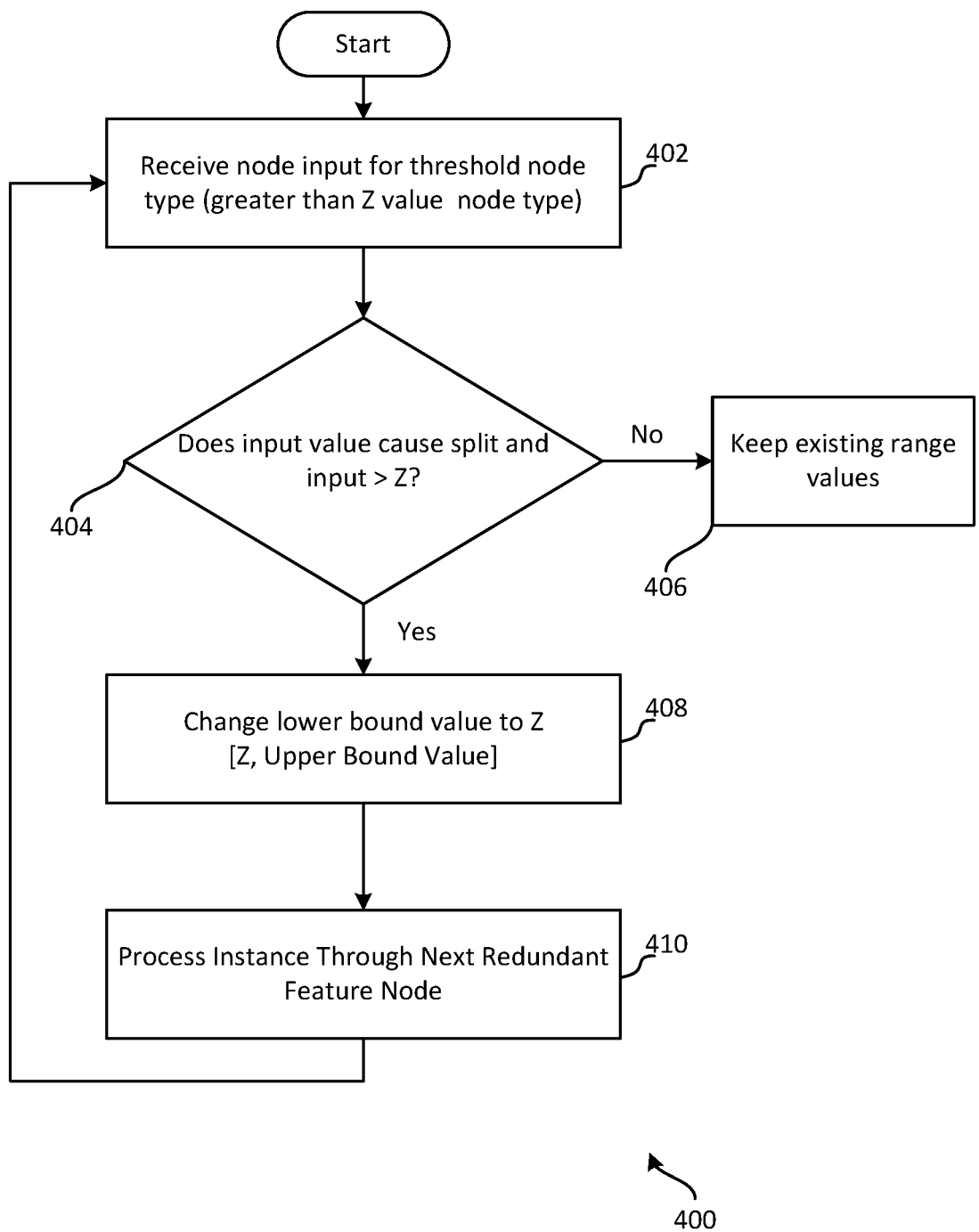
FIG. 4 is an exemplary method 400 for determining range values for nodes of a tree ensemble that split when an input value is greater than a threshold value.

FIG. 4 is an exemplary method 400 for determining range values for nodes of a tree ensemble that split when an input feature value is greater than a threshold value. The method begins at a start operation and moves to operation 402 where a node input (i.e., an instance) is received by a node that splits based on a threshold value. That is, the node splits to another node downstream when an input is received for a corresponding feature that is greater than value Z.

From operation 402 flow continues to operation 404 where a determination is made as to whether the input value for that feature from the received instance has a value greater than threshold value Z and therefore causes a split based on exceeding that threshold value. If a determination is made at operation 404 that the input value for that feature from the received instance is not greater than Z, and thus no split has occurred, flow continues to operation 406 and a baseline range of (−∞, ∞) is maintained If a determination is made at operation 404 that the input value for that feature from the received instance is greater than Z, flow continues to operation 408 where the baseline range is narrowed from (−∞, ∞) to (Z, ∞).

From operation 408 flow continues to operation 410 where the instance travels through each downstream node in the tree ensemble (and more importantly each node for which the feature is redundant), as well as each node in other trees in the tree ensemble if the ensemble comprises a plurality of trees containing a redundant node for the feature, and the method 400 is repeated at each node therein for the instance. That is, flow continues from operation 410 back to operation 402 where the next downstream node receives the instance and the method 400 repeats.

For example, if later in the same tree, or a different tree within the tree ensemble, a different node splits on feature value $Z_1$ for the same feature, and the instance causes that split based on a received input value for that feature that is greater than $Z_1$, then $Z_1$ is a potential new lower bound for that feature. That is, whichever value is larger (i.e., $Z_1$ or the current lower bound), will be the new lower bound. For example, where the current range is (Z, ∞) and $Z_1$ is greater than Z, the new range is then reduced to ($Z_1$, ∞). Alternatively, if $Z_1$ is less than Z, the range remains (Z, ∞).

Once the instance has traveled through each node of the tree ensemble the method 400 ends.

Figure 5:
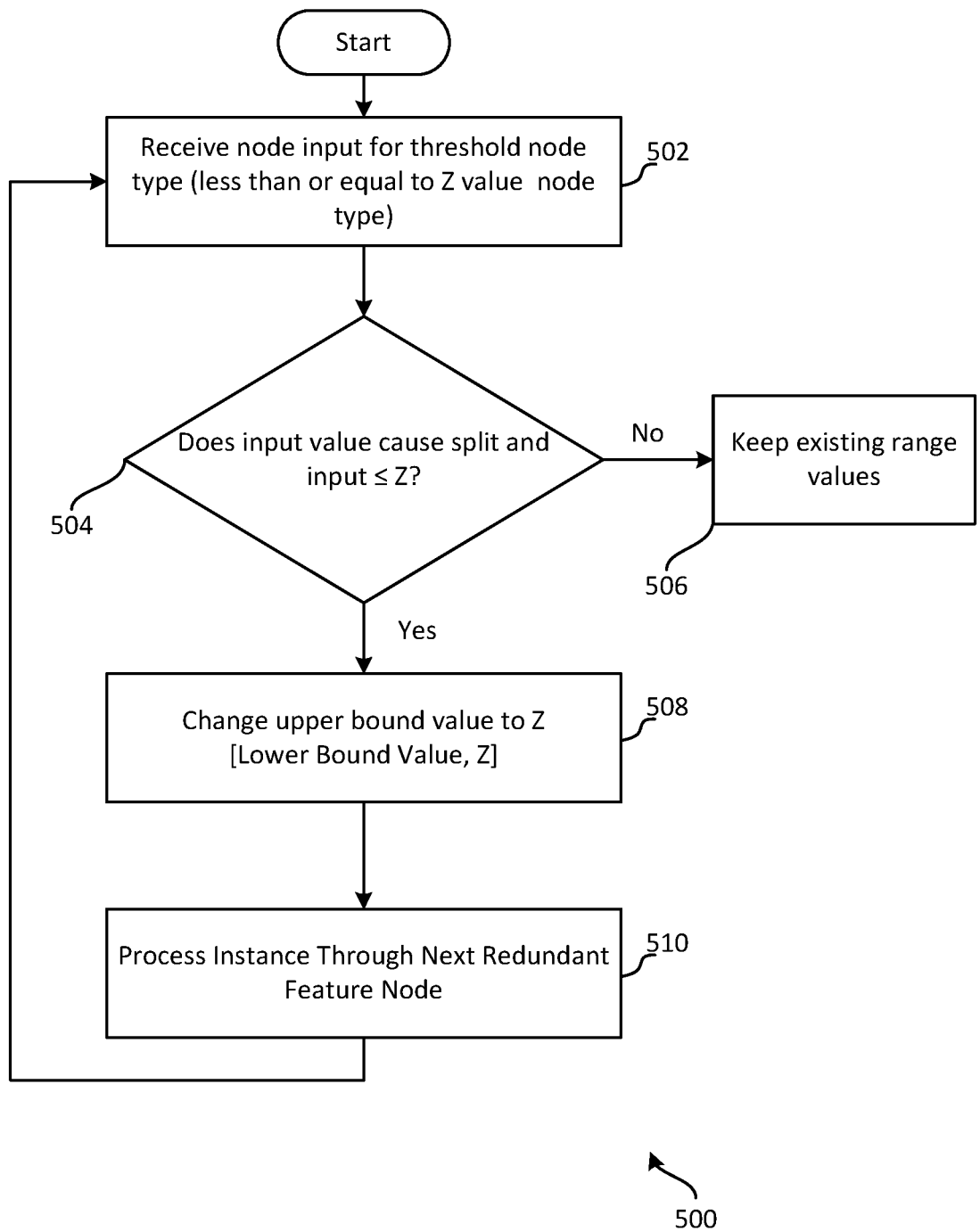
FIG. 5 is an exemplary method 500 for determining range values for nodes of a tree ensemble that split when an input value is less than or equal to a threshold value.

FIG. 5 is an exemplary method 500 for determining range values for nodes of a tree ensemble that split when an input feature value is less than or equal to a threshold value. The method begins at a start operation and moves to operation 502 where a node input (i.e., an instance) is received by a node that splits based on a threshold value. That is, the node splits to another node downstream when an input is received for a corresponding feature that is less than or equal to value Z.

From operation 502 flow continues to operation 504 where a determination is made as to whether the input value for that feature from the received instance has a value less than or equal to threshold value Z and therefore causes a split based on meeting or being below that threshold value.

If a determination is made at operation 504 that the input value for that feature from the received instance is not less than or equal to Z, and thus no split has occurred, flow continues to operation 506 and a baseline range of $(-\infty, \infty)$ for the node is maintained. If a determination is made at operation 504 that the input value for that feature from the received instance has a value for that node feature of less than or equal to Z, flow continues to operation 508 where the baseline range for that node is narrowed from $(-\infty, \infty)$ to $(-\infty, Z)$ in the case that Z is less than or equal to the current upper bound for the current range.

From operation 508 flow continues to operation 510 where the instance travels through each downstream node in the tree ensemble (and more importantly each node for which the feature is redundant), as well as each node in other trees in the tree ensemble if the ensemble comprises a plurality of trees containing a redundant node for the feature, and the method 500 is repeated at each node therein for the instance. That is, flow continues from operation 510 back to operation 502 where the next downstream node receives the instance and the method 500 repeats.

For example, if the feature range for the entrance node has narrowed the range for that feature to $(-\infty, Z)$, a second node may be encountered that splits on the same feature. Thus, if later in the same tree, or a different tree within the tree ensemble, a different node splits on feature value $Z_1$ for the same feature, and the instance being processed causes that split based on a received value for that feature that is less than $Z_1$, then $Z_1$ is a potential new upper bound for that feature. As such, whichever value is smaller (i.e., $Z_1$ or the current upper bound), will be the new upper bound. For example, where the current range is $(-\infty, Z)$ and $Z_1$ is less than Z, the new range is then reduced to $(-\infty, Z_1)$.

Once the instance has traveled through each node of the tree ensemble, the method 500 ends.

Figure 6:
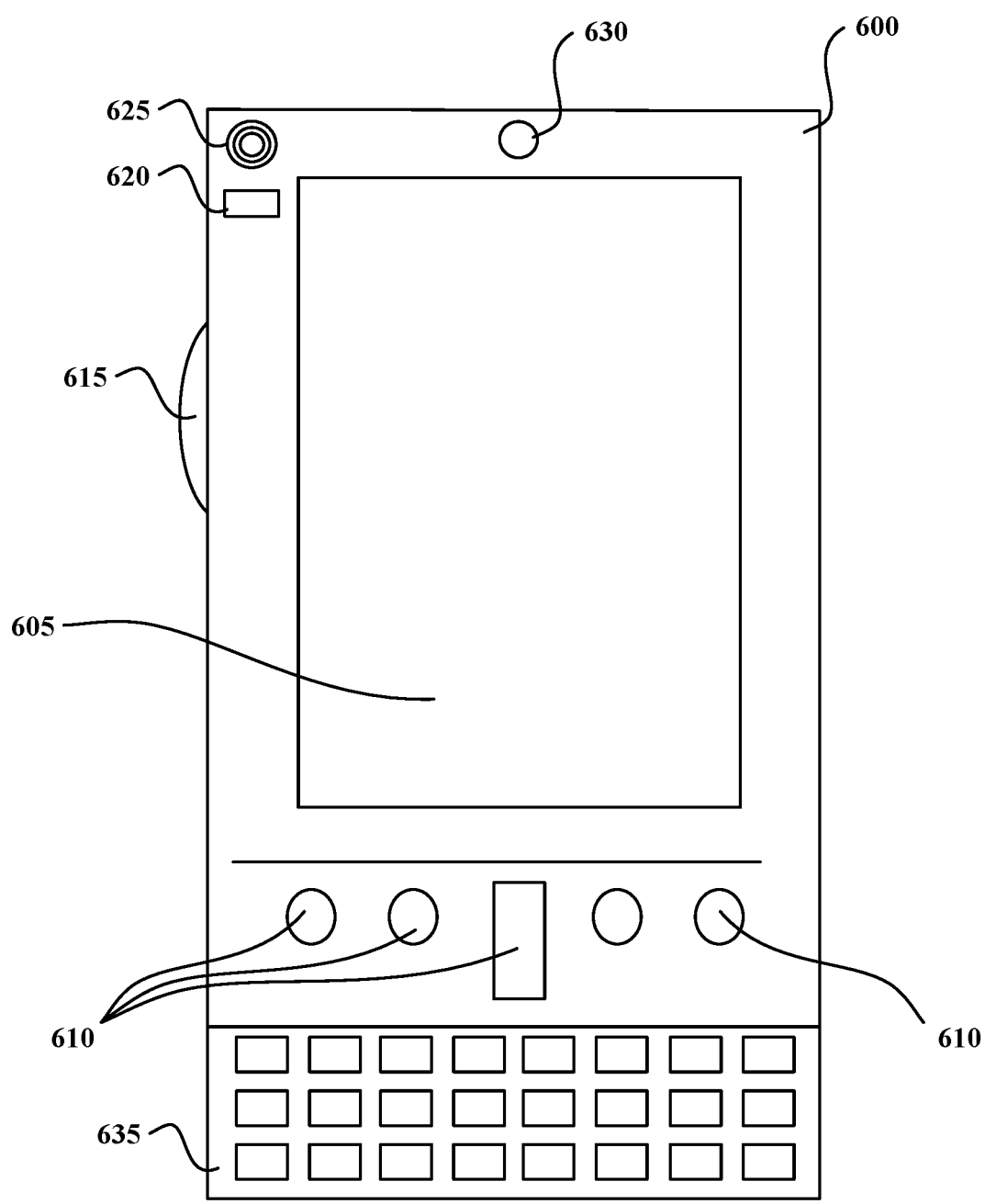
FIGS. 6 and 7 are simplified diagrams of a mobile computing device with which aspects of the disclosure may be practiced.
Figure 7:
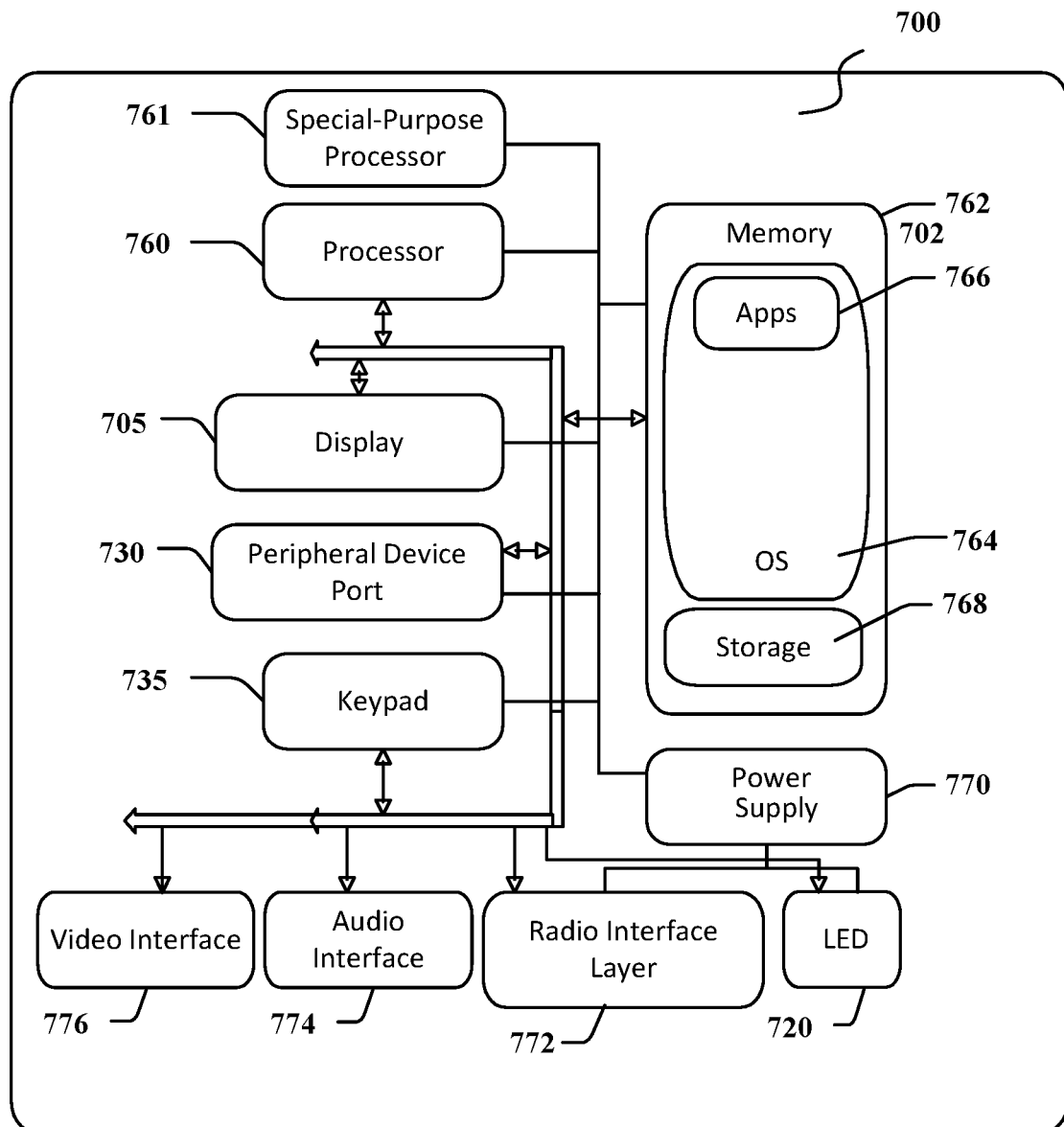

FIGS. 6 and 7 illustrate a mobile computing device 600, for example, a mobile telephone, a smart phone, wearable computer (such as a smart watch), a tablet computer, an e-reader, a laptop computer, and the like, with which embodiments of the disclosure may be practiced. In some aspects, the client may be a mobile computing device. With reference to FIG. 6, one aspect of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display). If included, an optional side input element 615 allows further user input. The side input element 615 may be a rotary switch, a button, or any other type of manual input element. In alternative aspects, mobile computing device 600 may incorporate more or less input elements. For example, the display 605 may not be a touch screen in some embodiments. In yet another alternative embodiment, the mobile computing device 600 is a portable phone system, such as a cellular phone. The mobile computing device 600 may also include an optional keypad 635. Optional keypad 635 may be a physical keypad or a "soft" keypad generated on the touch screen display. In various embodiments, the output elements include the display 605 for showing a graphical user interface (GUI), a visual indicator 620 (e.g., a light emitting diode), and/or an audio transducer 625 (e.g., a speaker). In some aspects, the mobile computing device 600 incorporates a vibration transducer for providing the user with tactile feedback. In yet another aspect, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 7 is a block diagram illustrating the architecture of one aspect of a mobile computing device. That is, the mobile computing device 700 can incorporate a system (e.g., an architecture) 702 to implement some aspects. In one embodiment, the system 702 is implemented as a "smart phone" capable of running one or more applications (e.g., browser, e-mail, calendaring, contact managers, messaging clients, games, and media clients/players). In some aspects, the system 702 is integrated as a computing device, such as an integrated personal digital assistant (PDA) and wireless phone.

One or more application programs 766 may be loaded into the memory 762 and run on or in association with the operating system 864. Examples of the application programs include phone dialer programs, e-mail programs, personal information management (PIM) programs, word processing programs, spreadsheet programs, Internet browser programs, messaging programs, and so forth. The system 702 also includes a non-volatile storage area 768 within the memory 762. The non-volatile storage area 768 may be used to store persistent information that should not be lost if the system 702 is powered down. The application programs 766 may use and store information in the non-volatile storage area 768, such as e-mail or other messages used by an e-mail application, and the like. A synchronization application (not shown) also resides on the system 702 and is programmed to interact with a corresponding synchronization application resident on a host computer to keep the information stored in the non-volatile storage area 768 synchronized with corresponding information stored at the host computer. As should be appreciated, other applications may be loaded into the memory 762 and run on the mobile computing device 700, including the instructions for providing and operating a tree ensemble optimization platform.

The system 702 has a power supply 770, which may be implemented as one or more batteries. The power supply 770 might further include an external power source, such as an AC adapter or a powered docking cradle that supplements or recharges the batteries.

The system 702 may also include a radio interface layer 772 that performs the function of transmitting and receiving radio frequency communications. The radio interface layer 772 facilitates wireless connectivity between the system 702 and the "outside world," via a communications carrier or service provider. Transmissions to and from the radio interface layer 772 are conducted under control of the operating system 764. In other words, communications received by the radio interface layer 772 may be disseminated to the application programs 766 via the operating system 764, and vice versa.

The visual indicator 620 may be used to provide visual notifications, and/or an audio interface 774 may be used for producing audible notifications via the audio transducer 625. In the illustrated embodiment, the visual indicator 620 is a light emitting diode (LED) and the audio transducer 625 is a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 625, the audio interface 774 may also be coupled to a microphone to receive audible input, such as to facilitate a telephone conversation. In accordance with embodiments of the present disclosure, the microphone may also serve as an audio sensor to facilitate control of notifications, as will be described below. The system 702 may further include a video interface 776 that enables an operation of an on-board camera 630 to record still images, video stream, and the like.

A mobile computing device 700 implementing the system 702 may have additional features or functionality. For example, the mobile computing device 700 may also include additional data storage devices (removable and/or non-removable) such as, magnetic disks, optical disks, or tape. Such additional storage is illustrated in FIG. 7 by the non-volatile storage area 768.

Data/information generated or captured by the mobile computing device 700 and stored via the system 702 may be stored locally on the mobile computing device 700, as described above, or the data may be stored on any number of storage media that may be accessed by the device via the radio interface layer 772 or via a wired connection between the mobile computing device 700 and a separate computing device associated with the mobile computing device 700, for example, a server computer in a distributed computing network, such as the Internet. As should be appreciated such data/information may be accessed via the mobile computing device 700 via the radio interface layer 772 or via a distributed computing network. Similarly, such data/information may be readily transferred between computing devices for storage and use according to well-known data/information transfer and storage means, including electronic mail and collaborative data/information sharing systems.

Figure 8:
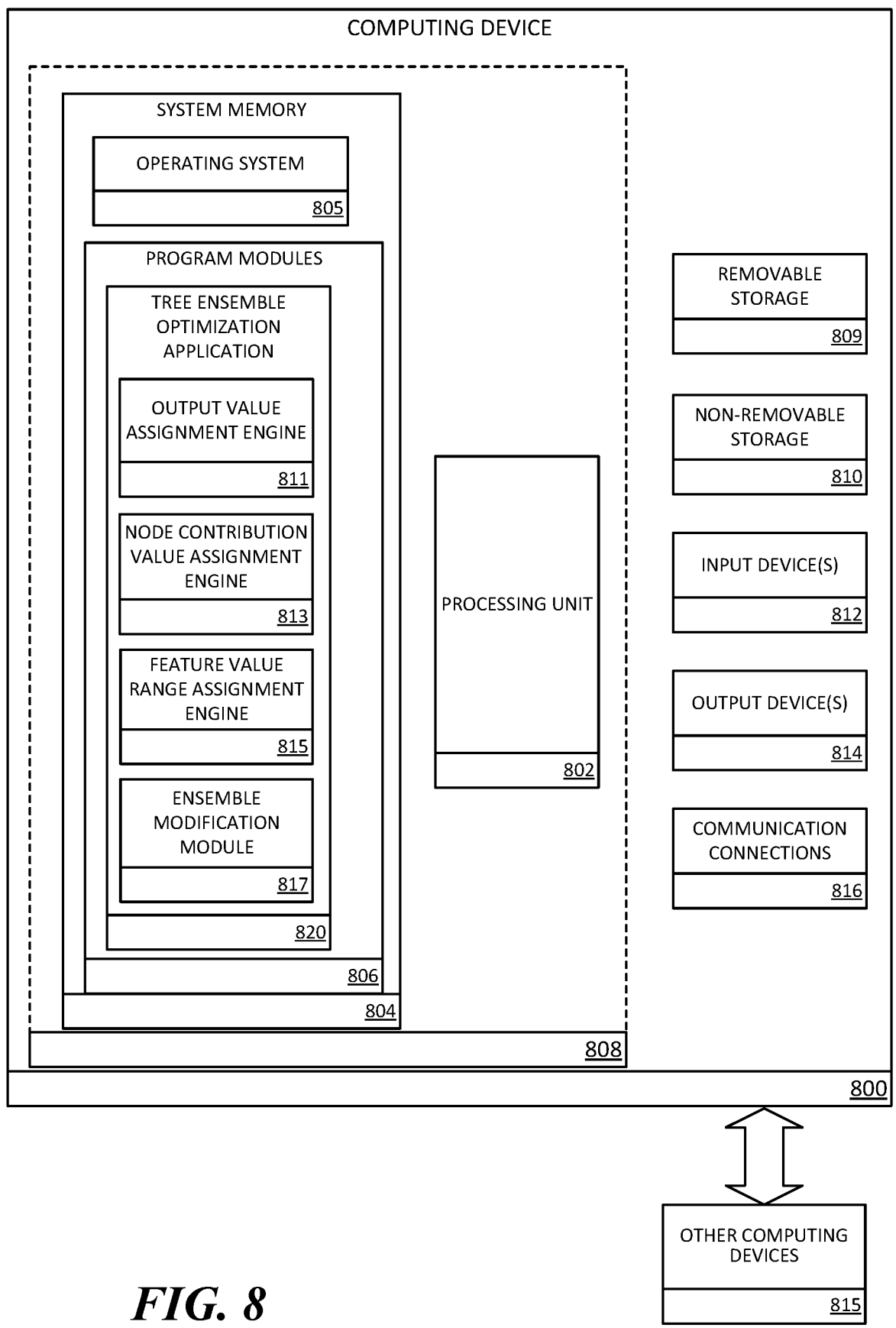
FIG. 8 is a block diagram illustrating example physical components of a computing device with which aspects of the disclosure may be practiced.

FIG. 8 is a block diagram illustrating physical components (e.g., hardware) of a computing device 800 with which aspects of the disclosure may be practiced. The computing device components described below may have computer executable instructions for optimizing tree ensemble systems. In a basic configuration, the computing device 800 may include at least one processing unit 802 and a system memory 804. Depending on the configuration and type of computing device, the system memory 804 may comprise, but is not limited to, volatile storage (e.g., random access memory), non-volatile storage (e.g., read-only memory), flash memory, or any combination of such memories. The system memory 804 may include an operating system 805 suitable for running one or more tree ensemble system optimization programs. The operating system 805, for example, may be suitable for controlling the operation of the computing device 800. Furthermore, embodiments of the disclosure may be practiced in conjunction with a graphics library, other operating systems, or any other application program and is not limited to any particular application or system. This basic configuration is illustrated in FIG. 8 by those components within a dashed line 808. The computing device 800 may have additional features or functionality. For example, the computing device 800 may also include additional data storage devices (removable and/or non-removable) such as, for example, magnetic disks, optical disks, or tape. Such additional storage is illustrated in FIG. 8 by a removable storage device 809 and a non-removable storage device 810.

As stated above, a number of program modules and data files may be stored in the system memory 804. While executing on the processing unit 802, the program modules 806 (e.g., tree ensemble optimization application 820) may perform processes including, but not limited to, the aspects, as described herein. According to examples, the output value assignment engine 811 may perform operations associated with determining the expected output values for one or more internal and/or entrance nodes of a tree ensemble. The node contribution value assignment engine 813 may perform operations associated with determining the contribution of one or more nodes of a tree ensemble to one or more downstream nodes in the tree ensemble. The feature value range assignment engine 815 may perform operations associated with determining the smallest possible range that would have produced the same set of contributions for one or more features in a tree ensemble. The ensemble modification module 817 may perform operations associated with modifying the structure or values of one or more nodes in a tree ensemble to increase the accuracy of the tree ensemble in making generating hypotheses.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 800 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 800 may also have one or more input device(s) 812 such as a keyboard, a mouse, a pen, a sound or voice input device, a touch or swipe input device, etc. The output device(s) 814 such as a display, speakers, a printer, etc. may also be included. The aforementioned devices are examples and others may be used. The computing device 800 may include one or more communication connections 816 allowing communications with other computing devices 850. Examples of suitable communication connections 816 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 804, the removable storage device 809, and the non-removable storage device 810 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 800. Any such computer storage media may be part of the computing device 800. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 9:
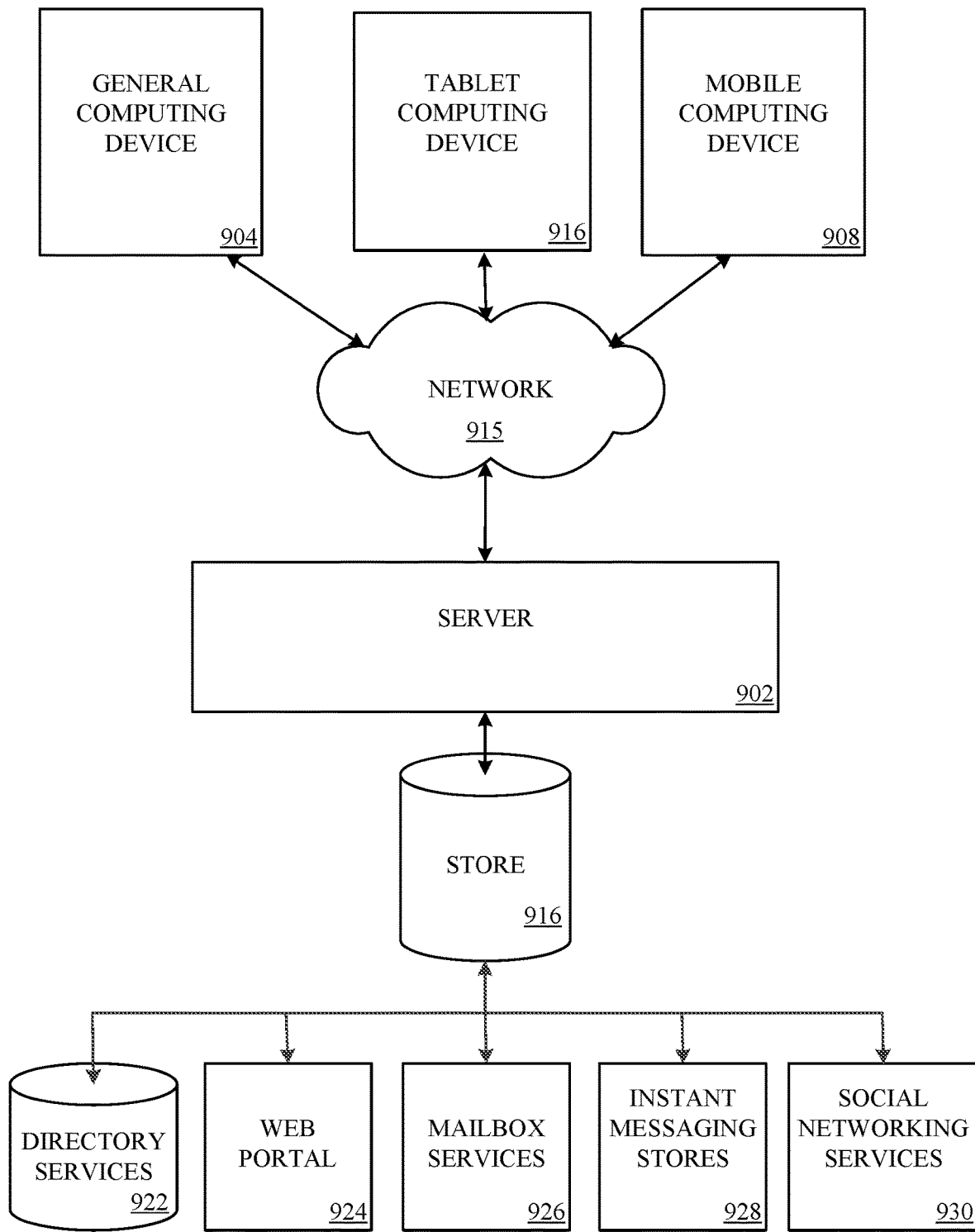
FIG. 9 is a simplified block diagram of a distributed computing system in which aspects of the present disclosure may be practiced.

FIG. 9 illustrates one aspect of the architecture of a system for processing data received at a computing system from a remote source, such as a personal/general computer 904, tablet computing device 906, or mobile computing device 908, as described above. Content displayed at server device 902 may be stored in different communication channels or other storage types. For example, various documents may be stored using a directory service 922, a web portal 924, a mailbox service 926, an instant messaging store 928, or a social networking site 930. The program modules 806 may be employed by a client that communicates with server device 902, and/or the program modules 806 may be employed by server device 902. The server device 902 may provide data to and from a client computing device such as a personal/general computer 904, a tablet computing device 906 and/or a mobile computing device 908 (e.g., a smart phone) through a network 915. By way of example, the computer system described above with respect to FIGS. 6-8 may be embodied in a personal/general computer 904, a tablet computing device 906 and/or a mobile computing device 908 (e.g., a smart phone). Any of these embodiments of the computing devices may obtain content from the store 916, in addition to receiving graphical data useable to be either pre-processed at a graphic-originating system, or post-processed at a receiving computing system.

Figure 10:
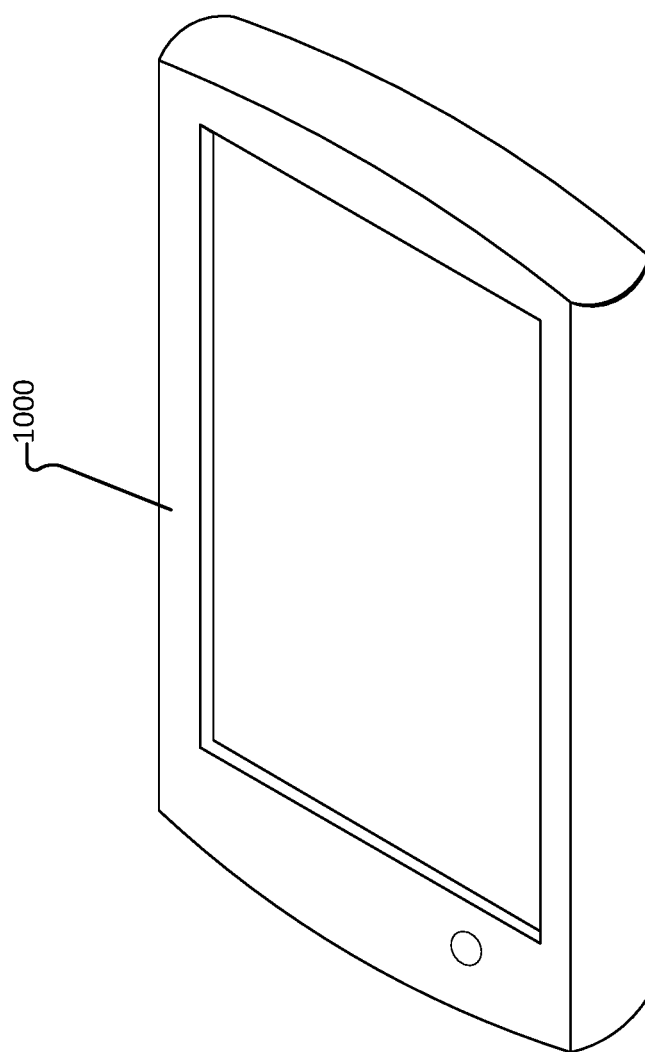
FIG. 10 illustrates a tablet computing device for executing one or more aspects of the present disclosure.

FIG. 10 illustrates an exemplary tablet computing device 1000 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The systems, methods, and devices described herein provide mechanisms for improving tree ensemble systems by, for example, automatically optimizing tree ensemble systems according to the impact that node output values and node contribution values have on generated ensemble hypotheses. The mechanisms described herein also provide tree ensemble optimization modalities that may be provided to users such that users may determine the likely cause of incorrect hypothesis and/or hypotheses generation by tree ensemble systems, including displaying a list of likely contributors involved in incorrect hypothesis generation. According to examples, users may also be provided with a ranked optimization operation execution list of the likely contributors to incorrect hypothesis generation, and the ability to intelligently modify tree ensembles according to those rankings. Thus, the systems, methods and devices described herein decrease the time required to improve ensemble hypothesis accuracy, minimize human guess work associated with determining the cause of inaccurate hypothesis generation, and minimize the computational processing costs associated with modifying tree ensemble structures based on traditional machine-learned and human-trained ensemble optimization techniques.

As will be understood from the foregoing disclosure, one aspect of the technology relates to a system for optimizing machine-learned tree ensemble prediction systems, comprising: a memory for storing executable program code; and a processor, functionally coupled to the memory, the processor being responsive to computer-executable instructions contained in the program code and operative to: receive, via a user interface, a request to access an ensemble tree structure; determine an output value for a leaf node of the ensemble tree structure; determine an output value for a first node immediately upstream from the leaf node; assign a node contribution value to the first node, wherein the node contribution value corresponds to a value difference between the output value for the leaf node and the output value for the first node; and cause the node contribution value to be displayed. According to some examples determining the output value for the first node further comprises: analyzing each of one or more leaf nodes directly downstream from the first node; determining an expected feature value for each of the analyzed leaf nodes; normalizing the expected feature values; and combining the normalized feature values into an output value for the first node. According to other examples, determining the expected feature value for each of the one or more analyzed leaf nodes comprises: analyzing a plurality of instances that have been processed by the ensemble tree structure; determining a first factor comprising a percentage of the plurality of instances that resulted at a particular leaf node of the one or more leaf nodes compared to the plurality of instances; and calculating a product of the first factor and the second factor, wherein the second factor comprises an output value for the particular leaf node. According to still other examples, normalizing the expected feature values comprises: analyzing the plurality of instances that have been processed by the ensemble tree structure; determining a divisor, the divisor comprising a total percentage of the plurality of instances that resulted at each of the one or more leaf nodes that are directly downstream from the first node; and calculating a quotient of a dividend and the divisor, wherein the dividend comprises the product of the first factor and the second factor. According to further examples, combining the normalized feature values comprises calculating a sum of each of the normalized feature values. According to yet other examples, the processor is further operative to: receive data for processing in the ensemble tree structure; process the data in the ensemble tree structure; and cause resulting classification of the data from the ensemble tree structure processing to be displayed. According to some examples, the processor is further operative to: compare the resulting classification of the data against a preferred classification for the data; and determine that a node output value of the ensemble tree structure contributed to a misclassification of the data. In other examples, the processor is further operative to adjust the node output value that contributed to the misclassification. In still other examples, the ensemble tree structure is selected from: a gradient boosted decision tree, a random forest, and a single decision tree.

In another aspect, the technology relates to a method for optimizing machine-learned tree ensemble prediction systems, the method comprising: receiving, via a user interface, a request to access an ensemble tree structure; determining an output value for a leaf node of the ensemble tree structure; determining an output value for a first node immediately upstream from the leaf node; assigning a node contribution value to the first node, wherein the node contribution value corresponds to a value difference between the output value for the leaf node and the output value for the first node; and causing the node contribution value to be displayed. In other examples, the method may comprise receiving data for processing in the ensemble tree structure; processing the data in the ensemble tree structure; and causing resulting classification of the data from the ensemble tree structure processing to be displayed. According to some examples, the method may further comprise clustering each of a plurality of instances according to at least one feature, wherein each cluster comprises a plurality of instances that share a highest ranked feature for which a corresponding node contribution value most impacted a resulting hypothesis. In other examples, the method may further comprise: determining that at least one cluster has a threshold number of instances that have been misclassified; increasing a weight associated with a plurality of instances in that cluster; and automatically retraining the ensemble tree structure based on the increased weight. In still other examples, the method may further comprise determining that at least one cluster has a threshold percentage of instances that have been misclassified; increasing a weight associated with a plurality of instances in that cluster; and automatically retraining the ensemble tree structure based on the increased weight. According to still other examples, the method may also comprise comparing the resulting classification of the data against a preferred classification for the data; and determining that a node contribution value of the ensemble tree structure contributed to a deviation from the preferred classification for the data. In other examples, the method may comprise adjusting the node contribution value that contributed to the misclassification. In yet other examples, the method may comprise adjusting a node split threshold value associated with the node that contributed to the misclassification. In other examples, the data may comprise a plurality of training instances and the preferred classification may be based on human classification of the plurality of training instances. In still other examples, the ensemble tree structure is a structure selected from: a gradient boosted decision tree, a random forest, and a single decision tree.

In another aspect, the technology relates to a method for receiving, by an ensemble tree structure, an input instance, wherein the ensemble tree structure comprises a feature that causes a split at a plurality of nodes in the ensemble tree structure based on at least one threshold input value; increasing a lower bound of a baseline range for the feature when an input value for the feature causes a node split for the feature based on the input value being greater than a threshold input value for that node split; and reducing an upper bound of the baseline range for the feature when an input value for the feature causes a node split for the feature based on the input value being less than a threshold input value for that node split. In some examples, the split is a positive indicator split for a hypothesis of the ensemble tree structure. In other examples, the split is a negative indicator split for a hypothesis of the ensemble tree structure. In yet other examples, the method may comprise reducing a baseline range for each of a plurality of common features that cause a split at a plurality of nodes in the ensemble tree structure; determining an output value for each of a plurality of common feature nodes for each of the common features; and ranking each of the common feature nodes according to their contribution to a hypothesis of the ensemble tree structure.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present disclosure, one skilled in the art may envision variations, modifications, and alternate aspects falling within the spirit of the broader aspects of the general inventive concept embodied in this application that do not depart from the broader scope of the claimed disclosure.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A system for optimizing machine-learned tree ensemble prediction systems, comprising:
    a memory device for storing executable program code; and
    a processor, functionally coupled to the memory device, the processor being responsive to computer-executable instructions contained in the program code and operative to:

receive, via a user interface, a request to access an ensemble tree structure;
determine a measured output value for a leaf node of the ensemble tree structure based on input data including a plurality of instances processed by the ensemble tree structure;
determine an expected output value for a first node immediately upstream from the leaf node based, at least in part, on the measured output value determined for the leaf node and at least one additional output value determined for at least one additional leaf node;
assign a node contribution value to the first node, wherein the node contribution value corresponds to a value difference between the expected output value for the leaf node and the measured output value for the first node;
compare the resulting classification of the data against a preferred classification for the data; and
determine that a node output value of the ensemble tree structure contributed to a misclassification of the data.

2. The system of claim 1, wherein the leaf nodes directly downstream of the first node are internal nodes of the ensemble tree structure, and wherein determining the expected output value for the first node further comprises:
analyzing each of the leaf nodes directly downstream from the first node;
determining an non-normalized expected output value for each of the analyzed leaf nodes as the measured output value for each of the leaf nodes;
normalizing the non-normalized expected output values; and
combining the normalized expected output values into an expected output value for the first node.

3. The system of claim 2, wherein determining the expected non-normalized expected output value for each of the one or more analyzed leaf nodes comprises:
analyzing a plurality of instances that have been processed by the ensemble tree structure;
determining a first factor comprising a percentage of the plurality of instances that resulted at a particular leaf node of the one or more leaf nodes compared to the plurality of instances; and
calculating a product of the first factor and the second factor, wherein the second factor comprises an output value for the particular leaf node.

4. The system of claim 3, wherein normalizing the expected non-normalized expected output values comprises:
analyzing the plurality of instances that have been processed by the ensemble tree structure;
determining a divisor, the divisor comprising a total percentage of the plurality of instances that resulted at each of the one or more leaf nodes that are directly downstream from the first node; and
calculating a quotient of a dividend and the divisor, wherein the dividend comprises the product of the first factor and the second factor.

5. The system of claim 2, wherein combining the normalized expected output values comprises calculating a sum of each of the normalized expected output values.

6. The system of claim 1, wherein the processor is further operative to:
receive data for processing in the ensemble tree structure;
process the data in the ensemble tree structure; and
cause resulting classification of the data from the ensemble tree structure processing to be displayed.

7. The system of claim 1, wherein the processor is further operative to adjust the node output value that contributed to the misclassification.

8. The system of claim 1, wherein the ensemble tree structure is selected from: a plurality of gradient boosted decision trees, a random forest, and a single decision tree.

9. A method performed by a computing system for optimizing machine-learned tree ensemble prediction systems, the method comprising:
receiving, via a user interface, a request to access an ensemble tree structure;
determining a measured output value for a leaf node of the ensemble tree structure based on input data including a plurality of instances processed by the ensemble tree structure;
determining an expected output value for a first node immediately upstream from the leaf node based, at least in part, on the measured output value determined for the leaf node and at least one additional output value determined for at least one additional leaf node;
assigning a node contribution value to the first node, wherein the node contribution value corresponds to a value difference between the measured output value for the leaf node and the expected output value for the first node;
comparing the resulting classification of the data against a preferred classification for the data; and
determining that a node output value of the ensemble tree structure contributed to a misclassification of the data.

10. The method of claim 9, further comprising:
receiving data for processing in the ensemble tree structure;
processing the data in the ensemble tree structure; and
causing resulting classification of the data from the ensemble tree structure processing to be displayed.

11. The method of claim 10, further comprising clustering each of a plurality of instances according to at least one feature, wherein each cluster comprises a plurality of instances that share a highest ranked feature for which a corresponding node contribution value most impacted a resulting hypothesis.

12. The method of claim 11, further comprising:
determining that at least one cluster has a threshold number of instances that have been misclassified;
increasing a weight associated with a plurality of instances in that cluster; and
automatically retraining the ensemble tree structure based on the increased weight.

13. The method of claim 11, further comprising:
determining that at least one cluster has a threshold percentage of instances that have been misclassified;
increasing a weight associated with a plurality of instances in that cluster; and
automatically retraining the ensemble tree structure based on the increased weight.

14. The method of claim 10, wherein the data comprises a plurality of training instances and the preferred classification is based on human classification of the plurality of training instances.

15. The method of claim 9, wherein the ensemble tree structure is a structure selected from: a plurality of gradient boosted decision trees, a random forest, and a single decision tree.

16. A method for computing feature ranges for machine-learned tree ensemble prediction systems, the method comprising:

receiving, by an ensemble tree structure, an input instance, wherein the ensemble tree structure comprises a feature that causes a split at a plurality of nodes in the ensemble tree structure based on at least one threshold input value, wherein at least some of the plurality of nodes are internal nodes of the ensemble tree structure;

increasing a lower bound of a baseline range for the feature when an input value for the feature causes a node split for the feature based on the input value for the feature being greater than a threshold input value for that node split; and reducing an upper bound of the baseline range for the feature when an input value for the feature causes a node split for the feature based on the input value for the feature being less than a threshold input value for that node split.

17. The method of claim 16, wherein the split is a positive indicator split for a hypothesis of the ensemble tree structure.

18. The method of claim 16, wherein the split is a negative indicator split for a hypothesis of the ensemble tree structure.

19. The method of claim 16, further comprising:

minimizing a baseline range for each of a plurality of common features that cause a split at a plurality of nodes in the in the ensemble tree structure;

determining an output value for each of a plurality of common feature nodes for each of the common features; and ranking each of the common feature nodes according to their contribution to a hypothesis of the ensemble tree structure.

* * * * *